F. H. GERDEMAN.
TRACTOR.
APPLICATION FILED JULY 10, 1917.
1,255,404.
Patented Feb. 5, 1918.
4 SHEETS—SHEET 1.
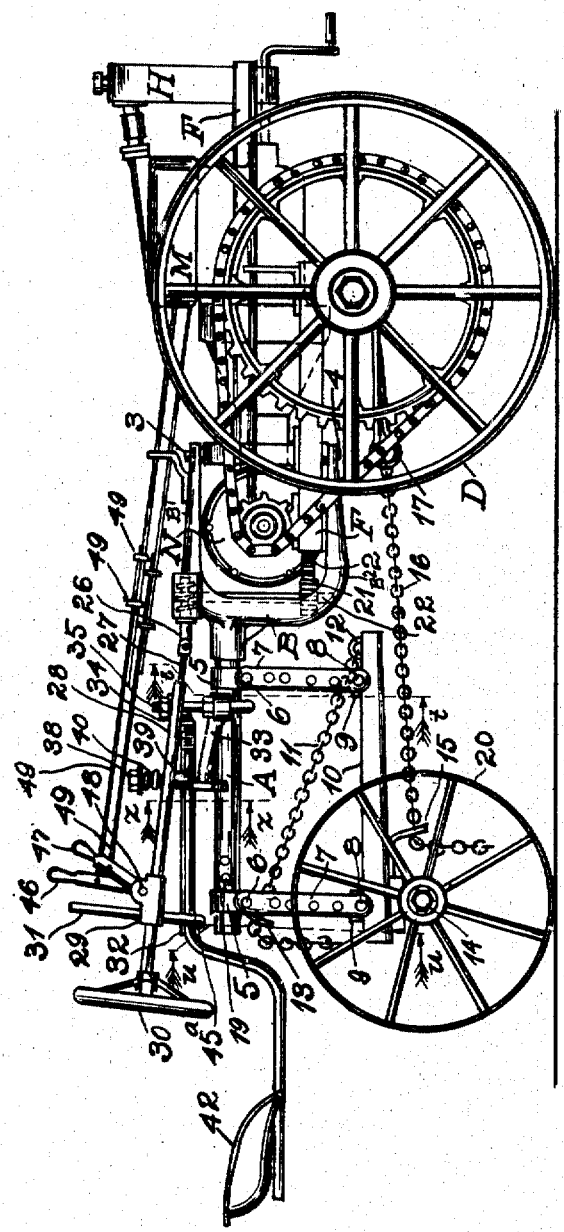
Fig 1
WITNESSES:
INVENTOR.
FRANK H. GERDEMAN
BY
ATTORNEY.

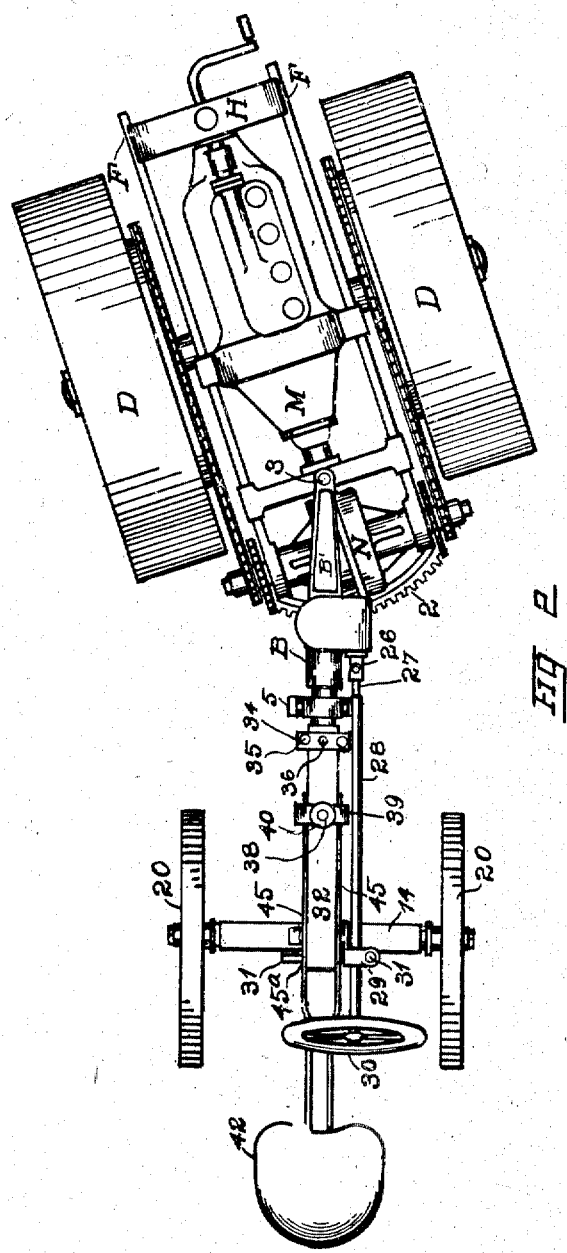

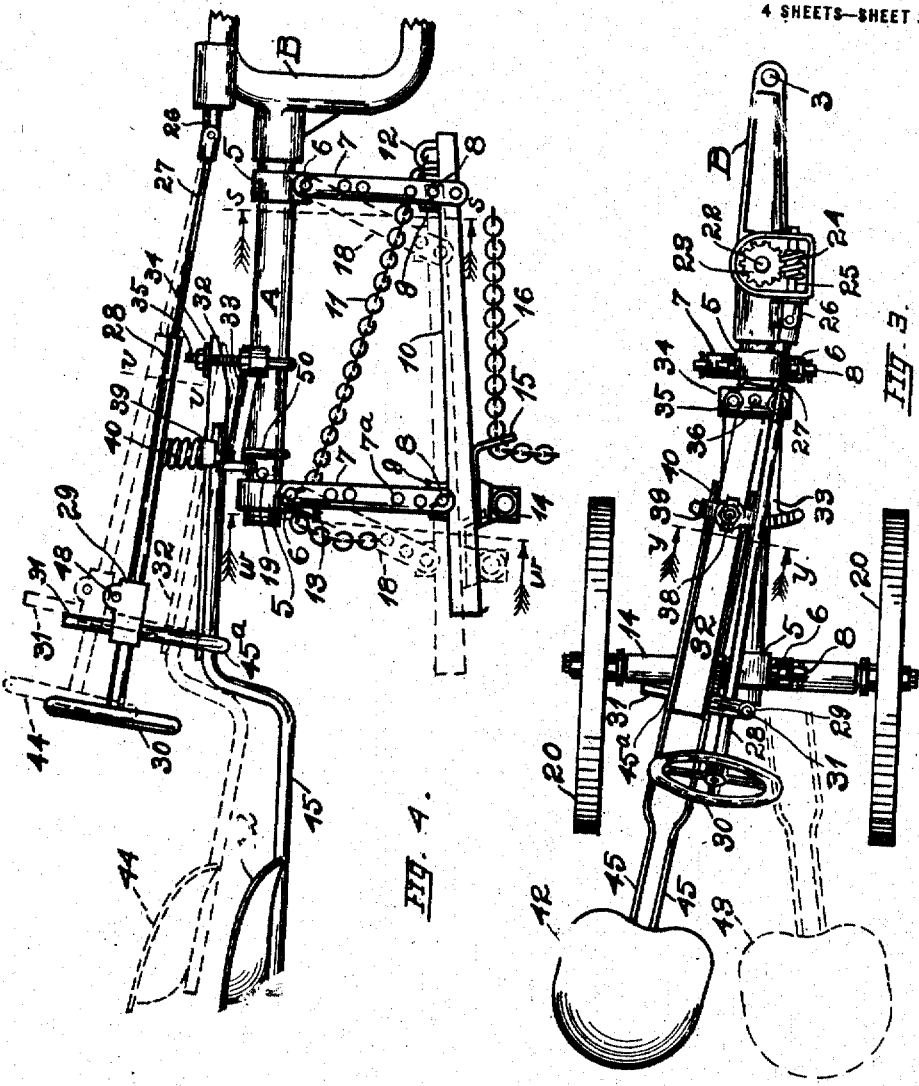

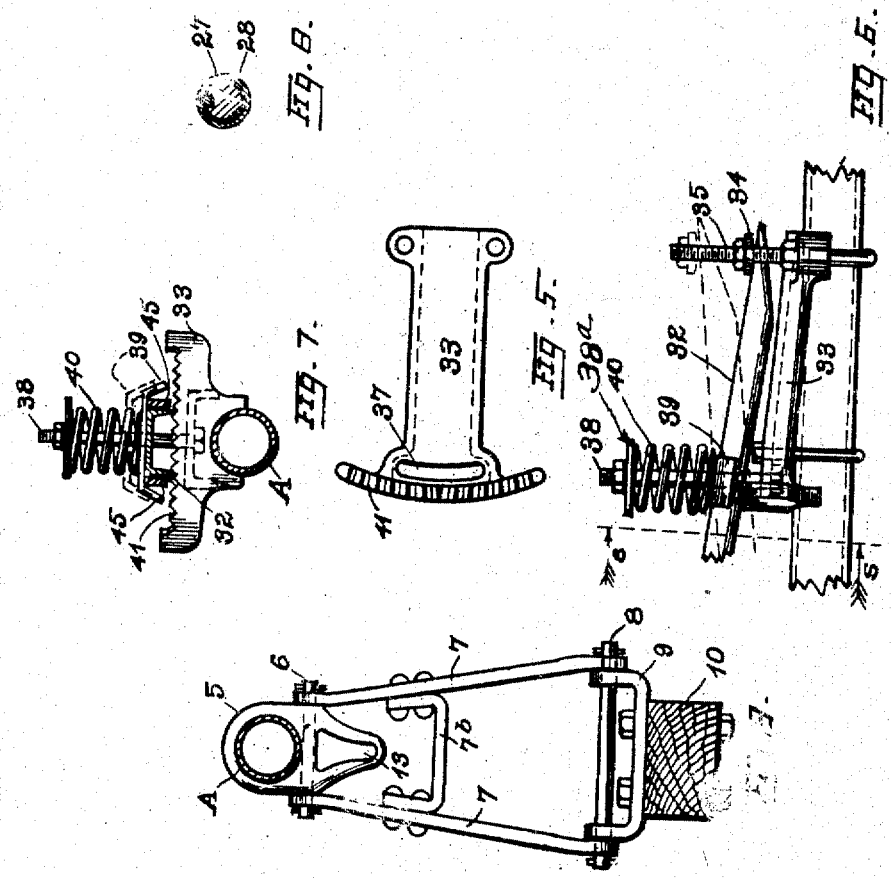

UNITED STATES PATENT OFFICE.

FRANK H. GERDEMAN, OF FINDLAY, OHIO, ASSIGNOR TO STAR TRACTOR COMPANY, OF FINDLAY, OHIO, A CORPORATION OF OHIO.

TRACTOR.

1,255,404.   Specification of Letters Patent.   Patented Feb. 5, 1918.

Application filed July 10, 1917. Serial No. 179,761.

*To all whom it may concern:*

Be it known that I, FRANK H. GERDEMAN, a citizen of the United States, residing at Findlay, in the county of Hancock and State of Ohio, have invented certain new and useful Improvements in Tractors, of which the following is a specification.

This invention relates to tractors, and more particularly to tractors of the two-wheel type which are especially adapted for use in connection with various agricultural implements or farm vehicles.

Accordingly, the object of the present invention is to provide novel improvements in tractors of the type set forth whereby the same may be readily used in connection with various types and forms of farm implements, vehicles, and machines, it being readily adjustable to operate at various elevations, and employing simple, positive, and reliable means for connecting either with the implement to be drawn, or a truck which will support the rear end thereof when no implement is used.

Another object of the invention is to provide a novel operator's control unit carried by the tractor and including means for adjusting the steering and motor control elements whereby the same may be easily manipulated by the operator who may be seated on the tool drawn by the tractor, or on the tractor itself. This feature of the invention enables the device to be easily adjusted to meet the requirements of the implement which is to be drawn, and also makes it possible for the tractor and the implement to both be managed by a single operator as in the case of an animal drawn implement.

With the above and other objects in view which will more readily appear as the nature of the invention is better understood, the same consists in the novel construction, combination and arrangement of parts hereinafter more fully described, illustrated and claimed.

The accompanying drawings illustrate a simple and preferred form of the invention. However, it will be understood that no limitation is necessarily made to the precise structural details therein exhibited, but that changes, alterations, and modifications within the scope of the claims may be resorted to when desired.

In the said drawings:

Figure 1 is a right hand side elevation of my tractor constructed in accordance with the invention and having a rear truck attached thereto instead of the implement to be drawn.

Fig. 2 is a top plan view of the tractor shown in Fig. 1 except that it is shown as in the act of turning to the left.

Fig. 3 is a top plan view of the rear end construction showing the removable truck and the operator's control unit moved to the left in full lines, and to the right in dotted lines, the motor control levers being omitted.

Fig. 4 is a side elevation with the front part of the tractor broken away, and rear truck wheels left off showing the operator's control unit which includes the seat and steering wheel moved backward, the control levers being omitted.

Fig. 5 is a plan view of the member on which the entire operator's control unit is mounted.

Fig. 6 is a detail side elevation showing the means for mounting the channel bar of the adjustable bracket of the control unit on the member shown in Fig. 5.

Fig. 7 is a detailed view partly in elevation and partly in section seen from the left of line $z$—$z$ of Fig. 1.

Fig. 8 is a cross section of the steering column taken on the line $v$—$v$ of Fig. 4.

Fig. 9 is a detailed elevation on an enlarged scale seen from the left of lines $u$—$u$ and $t$—$t$ of Fig. 1, and $s$—$s$ and $w$—$w$ of Fig. 4.

Similar reference characters designate corresponding parts throughout the several figures of the drawings.

In the following description it will not be necessary to enter into detail as to the various devices which are common to tractors and other motor vehicles, but I will only describe in detail such parts as are new, referring merely to the parts which are old in a general way, and to these arrangements with relation to each other, which arrangements may be varied.

Referring now to the drawings in detail, it will be seen that F designates the motor frame having cross members which support the motor and transmission M, the radiator H, differential N, drive wheels D, and various other parts. The rear edge of the said frame F is provided with a segmental rack 2, which is preferably integral therewith, all parts of the frame being preferably formed in one integral construction.

For the purpose of providing the desired connection between the tractor and the device to be drawn, and at the same time supporting the novel operator's control unit, presently referred to, it is proposed to provide a draft element which essentially comprises a body portion or shaft A which may be of tubular cross section and provided at its forward end with a yoke designated generally as B, and having the yoke arms $B^1$ and $B^2$ which are respectively connected at the upper side of the frame F as indicated at 3, and to the under side of said frame as at 4, whereby the said draft element will have a free pivotal connection with the frame to permit of the necessary movement of the tractor to change its direction of travel. The body portion A of this draft device carries at its upper side the adjustable operator's control element previously referred to, and also has depending therefrom the means for connecting or coupling the implement to be drawn to the tractor.

As shown, the said means for connecting the implement to be drawn essentially includes in its organization the two sleeves 5 which are spaced apart on the tubular body portion A of the draft element and are loosely mounted thereon to permit of a relative rotary or swinging movement of the depending adjustment bars 7—7 on the bolts 6. These bars 7—7 are securely fastened together by a cross-piece $7^b$ (see Fig. 9), to thereby constitute hanger brackets, and are provided with a plurality of adjustment openings $7^a$ arranged at different elevations for receiving the bolts 8 which are adapted to connect with the ends of the channel shaped members 9—9 adapted to be securely bolted or otherwise fastened to the stub tongue 10 of the rear truck or other device to be drawn.

For the purpose of stabilizing the connection between the tongue of the truck or other implement to be drawn, and the tractor, under all conditions of use, both reverse and draw chains are utilized. The reverse draw chain 11 is rigidly secured to the forward end of the tongue 10 by U-bolts 12, and the other end of said chain is fastened in the vertical keeper slot 13 of the rear sleeve 5, (see Fig. 9), which slot is slightly larger at its upper end than at its bottom end, whereby the chain 11 may be quickly and adjustably fastened to firmly hold the said sleeve 5 against the laterally projecting pin 19, and act as a check for the trailing vehicle when the tractor slows down, or as a positive connection when the tractor is reversed. As shown, near the axle 14 of the truck, on the underside of the tongue 10 is a downward projecting draw chain keeper member 15, having a slot similar to the slot 13 of the sleeve 5. This member 15 adjustably receives one end of the draw chain 16 whose other end is fastened to the draw bar 17, (Fig. 1) which is securely fastened to the under side of the main frame F of the tractor. Thus, it will be apparent that the draw bar 17 of Fig. 1, and the chain 16 provide a positive draw connection for pulling various kinds of tools, implements, or machinery commonly employed in farm work, while the chain 11 provides the necessary connection to push the implement backward when the motor of the tractor is reversed, or as previously indicated to provide a check for arresting the momentum of the trailing vehicle. By shortening or lengthening one of these chains 11 or 16 relatively to the other, the hanger brackets which include the adjustment bars 7—7 will swing at their upper ends on the bolts 6—6 and at their lower ends on the bolts 8—8, allowing an adjustment forward and backward as shown by the dotted lines 18 of Fig. 4. When the tractor is to be operated alone or without the rigid connection with an implement, then it is necessary to employ the truck as shown in Figs. 1, 2, and 3, in order to support the rear end of the same and when attached to an implement, the rear truck is of course removed by withdrawing the bolts 8—8 and loosening chains 11 and 16 seen in Figs. 1 and 4.

Near the lower portion of the yoke B seen in Figs. 1 to 4 inclusive is located a gear 21, which is shown in Fig. 1 meshing with the segmental rack 2 of the frame F. To this gear 21 is fastened a short upright shaft 22, having at its upper end a worm gear 23, (Fig. 3) which meshes with worm 24 provided with a short shaft 25, which has fastened thereto one part of a universal joint 26, the other part of which latter has a shaft 27 of considerable length fastened thereto and which telescopes with a hollow tube 28. This tube is slidably fastened to said shaft 27 by a long key-way which extends the full length of the shaft and thus the two parts are locked together, as shown in section in Fig. 8.

A suitable steering wheel 30 is securely fastened to the end of the tube 28 which forms a part of the extensible steering post by which the direction of movement of the tractor is controlled, and for the purpose of mounting this steering post so that it may be vertically adjustable as well as extensible, it is proposed to mount the same in a suitable block 29, which is a part of the operator's control unit that includes in its organization an upright arm 31 on which the said block 29 is slidable, and capable of being locked thereto by means of a set screw not shown.

The said upright bar 31 on which the block 29 is slidable forms a part of an adjustable bracket. That is to say, the arm 31 has its lower portion bent at an angle and securely fastened at the extreme rear end of a channel bar 32, whereby the same is rigidly carried by the bar and always maintains the same relative position thereto. This adjustable bracket which includes the arm 31 and bar 32 is supported on a suitable adjustment member 33, preferably in the form of a casting which is secured to the tubular body portion A of the draft element by the U-bolts 35 and 50 and longitudinally adjustable thereon when the bolts are loosened. As will be observed more especially from Fig. 7 of the drawings, the said channel bar 32 of the bracket is inverted and has its end opposite the arm 31 secured by means of a bolt 36 to the central portion of an adjustable plate 34 carried by the upstanding threaded ends of the U-bolt 35 which assists in clamping the member 33 to the tubular body portion of the draft element. The intermediate portion of this inverted bar 32 engages with the toothed segment 41 of the member 33, and since one end thereof is attached to the adjustable plate 34, it will be apparent that the end of the channel bar member to which the arm 31 is attached is capable of a vertical movement.

With further reference to the member 33 it will be observed from Fig. 5 that the same is provided with a slot 37 which receives the head of a bolt 38 whose shank portion passes through the web of the channel bar 32, and is surrounded by a coil spring 40 which is confined between the clamping plate 39 which overlies the outer face of the bar 32, and a suitable abutment washer 38$^a$ on the threaded end of the bolt 38. Since this bolt 38 is engaged with the member 33 it will be apparent that the full tension of the spring 40 is exerted upon the plate 39 and rear face of the channel bar 32 whereby the opposite flanges of the bar will be maintained in engagement with the toothed segment 41. Since the slot 37 is formed on an arc of a circle corresponding to the curvature of the segment 41, it will be apparent that the entire bracket which includes the abutment 31 and bar 32 may be shifted laterally, that is from right to left and carry therewith all of the various instrumentalities supported thereby, by merely lifting the bar out of engagement with the teeth of the segment and moving the same.

The operator's seat 42 is carried by a pair of supporting bars 45, which are of the angular formation shown and are fulcrumed on the upper side of the horizontally disposed portion of the upright arm 31, as indicated at 45$^a$. These bars 45 which support the operator's seat are spaced apart and parallel, and extend along the opposite sides of the channel bar 32 until their free ends engage beneath the down turned ends of the clamping plate 39, as shown in Fig. 7. This clamping plate 39, it will be remembered, is under the tension of the spring 40 which presses downwardly on the entire channel bar for the purpose of holding the opposite flanges thereof in engagement with the toothed segment 41. Accordingly, with this arrangement, it will be apparent that the seat 42 is yieldably mounted upon the adjustable bracket 31—32, and in addition to supporting this seat, the said bracket also supports the steering post as previously pointed out and the motor control or gear shifting levers 46 and 47. That is to say, the said gear shifting levers are pivotally mounted as at 48 upon the upstanding ear portion of the block 29, whereby the levers will be in a convenient position for manipulation by the operator. These gear shifting levers are extensibly connected with the instrumentalities in the transmission mechanism which operate the gears thereof to change the speed, etc., and convenient means for rendering these connections extensible may be utilized, such for instance as the loops or guide straps 49—49 or their equivalent.

From the foregoing description it will be apparent that the present invention provides a novel connection between the tractor and the implement to be drawn, which not only provides for an effective coupling of the implement to the tractor, but at the same time provides for supporting an operator's control unit which supports the various control levers and operator's seat in such a manner that the same may be readily adapted to meet the requirements of various types of machines, tools, implements, or vehicles. That is to say, the draft element carries at its under side suitable hanger brackets which are loosely mounted whereby a relative swinging movement thereof is possible, and which hanger brackets are provided with means for securing thereto the tongue or pole of the implement or truck to be drawn, at any elevation. This arrangement also includes a novel arrangement of slotted keeper elements 13 and 15 which respectively receive the draw and reverse chains that materially add to the effectiveness of the coupling between the tractor and the implement to be drawn. And, in addition to supporting the means for connecting the implement with the tractor, the body portion A of the draft element supports the operator's control unit which is longitudinally adjustable as a whole thereon, and includes means whereby other desirable adjustments may be effected. That is to say, the operator's control unit as a whole is mounted on the member 33 which is adjustable longitudinally on the body A, and said member 33 in turn supports a novel bracket consisting of the arm 31 and the bar 32 which is both vertically and laterally adjustable through the provision of the segment 41 and the adjustable plate 34. This bracket also carries the seat 42 mounted on the bars 45 whose intermediate portions are fulcrumed on the lower angular end of the arm 31, while their free ends are engaged beneath the clamping plate 39 which is under the tension of the spring 41 that serves to hold the channel beam in engagement with the serrated segment 41. Thus the necessary cushion effect is given to the seat 42 by the spring 40 which performs the functions heretofore referred to.

The block 29 which is vertically adjustable on the arm 31 has mounted therein the extensible steering post 27—28, and also supports the control levers 46 and 47 which have extensible connections with the proper devices associated with the motor for controlling the speed, etc., of the tractor. Accordingly, when the entire operator's control unit is shifted longitudinally along the tubular portion A of the draft element the steering post and operation connections for the control levers will be automatically extended longitudinally also.

I claim:

1. A tractor including a frame, a draft element including a shaft portion having a yoke formed at one end thereof and the arms of the latter pivotally connecting with said frame, and an operator's control unit adjustably mounted on the said shaft portion of the draft element and including the steering gear, operator's seat, and engine control connections.

2. A tractor including a frame having a rack, a draft element including a shaft portion having a yoke formed at one end thereof and the arms of which yoke pivotally connect with said frame, an operator's control unit shiftably mounted on the said shaft portion of the draft element and including a steering wheel, extensible operating connections between said wheel and the rack, a yieldingly mounted and laterally adjustable driver's seat, and control levers having extensible connections with the engine of the tractor.

3. A tractor including a frame, a draft element having a yoke portion pivotally connected with the frame, an operator's control unit carried by the body portion of the draft element and including an adjustable bracket, a driver's seat, supports for said driver's seat fulcrumed at their intermediate portion upon a part of said bracket, a spring device associated with said bracket for engaging the free ends of the supports for said seat, and means adjustably mounted on the upstanding portion of said bracket for supporting the steering column and control levers.

4. A tractor including a frame, a draft element having a yoke portion pivotally connected with the frame, an operator's control unit carried by the body portion of the draft element and including a bracket element having a substantially horizontal channel beam portion and an upstanding arm rigid therewith, means for adjusting the channel bar portion of said bracket both vertically and horizontally, an operator's seat yieldably fulcrumed on the portion of said arm connected with the channel bar, a block adjustably carried by the upstanding arm of the bracket, a steering column mounted in said block, and control levers pivotally mounted in said block.

5. A tractor including a frame, a draft element having a yoke portion pivotally connected with the frame, an operator's control unit carried by the draft element, means also carried by the draft element for connecting the same with the implement to be drawn, said means comprising a pair of pivotally suspended hanger brackets having means for securing the tongue of the implement to be drawn thereto at different elevations.

6. A tractor including a frame, a draft element having a yoke portion pivotally connected with the frame, a draw bar also connected with the frame, and means carried by the body of the draft element for coupling the implement to be drawn to the tractor consisting of hanger brackets having means for adjustably engaging the tongue of the implement to be drawn, and draw and reverse chains respectively connected with the draw bar and the tongue of the implement to be drawn, and with the end of the body of the draft element and the tongue of the implement to be drawn at a point between the draw bar and the said connection of the draw chain with the tongue.

7. A tractor including a frame, a draft element including a body portion having at one end a yoke portion straddling the main frame whereby its opposite ends may be respectively connected to the upper and lower sides thereof, sleeves loosely and rotatably mounted on the body of said draft element and respectively located at the opposite ends thereof, depending brackets pivotally carried by said sleeves, and means adapted to be secured to the tongue of the implement to be drawn, and adjustably connected to said brackets.

8. A tractor including a frame, a draft element having a yoke portion connected with the frame, means carried by the body portion of said element for connecting with the implement to be drawn, an operator's control unit also carried by the body portion of the draft element and including a bracket which is laterally adjustable and whose free end is vertically adjustable, an adjustable block carried by a portion of said bracket, an extensible steering column mounted in said adjustable block, and control levers pivotally carried by said block, and having extensible motor connections.

9. A tractor including a frame, a draft element having a yoke portion pivotally connected with said frame, means carried by the body of said draft element for connecting with the implement to be drawn, an operator's control unit carried by the body portion of the draft element and including a member rigidly secured to said body portion of the draft element and having a toothed segment at one end, a bracket element comprising a channel bar and an upstanding arm, said channel bar of the bracket adapted to engage with the said segment, a spring for maintaining the channel bar in engagement with the segment, a clamping plate between said spring and channel bar, an operator's seat, bars for supporting the operator's seat fulcrumed at their intermediate portion on the portion of the upright member of the bracket which connects with the channel bar and having their free ends engaging beneath the clamping plate, means carried by the other end of said member having the segment for engaging the free end of the channel bar, a block adjustably carried by the upstanding arm of said bracket, and a steering post and control levers carried by said block.

In testimony whereof I hereunto affix my signature in the presence of two witnesses.

FRANK H. GERDEMAN.

Witnesses:
GRACE HARRIS,
CHARLES E. JORDAN.